United States Patent

[11] 3,627,282

[72] Inventor William G. Kinslow, Jr.
 Kansas City, Mo.
[21] Appl. No. 875,081
[22] Filed Nov. 10, 1969
[45] Patented Dec. 14, 1971
[73] Assignee Phillips Petroleum Company
 Continuation-in-part of application Ser. No. 696,329, Jan. 8, 1968, now Patent No. 3,477,700. This application Nov. 10, 1969, Ser. No. 875,081

[54] PATH ARRANGEMENT FOR PARISON HEATING
10 Claims, 3 Drawing Figs.
[52] U.S. Cl. ........................................ 263/8
[51] Int. Cl. ........................................ F27b 9/24
[50] Field of Search ............................ 263/8; 18/DIG. 39

[56] References Cited
UNITED STATES PATENTS

| | | | |
|---|---|---|---|
| 2,548,683 | 4/1951 | Remington et al. | 263/8 |
| 3,186,028 | 6/1965 | Dobbins et al. | 263/8 X |
| 3,283,046 | 11/1966 | De Witt et al. | 18/DIG. 39 |
| 3,477,700 | 11/1969 | Kinslow, Jr. | 263/8 |

Primary Examiner—John J. Camby
Attorney—Young and Quigg

ABSTRACT: Preformed hollow parisons are received on vertically disposed pins attached to an endless chain which conveys these parisons through a heating oven and out at a point spaced away from the side walls of said oven. After the parisons have traveled though the oven and been heated to the desired temperature, the pins are rotated 90° so as to transfer the parisons to a horizontal position. These horizontally disposed parisons are then ready to be received by a molding station. A preferred apparatus for accomplishing the transfer of the parisons from a vertical to a horizontal position comprises a support base to which the support pins are fixedly attached, this base being hinged at one end to a flange extending upwardly from a link plate on the chain; a cam follower fixedly attached to the other end of this base; and a stationary cam plate. The support base is biased so as to support the support pin in a vertical position by a spring or spring clip; as the chain advances the cam follower contacts the stationary cam plate; this cam follower riding against the cam plate causes the support base to pivot about the hinge so as to rotate the support pin from a vertical to a horizontal position, and then as the cam follower passes the high point on the cam plate the base is rotated back so as to return the support pin to a vertical position.

PATENTED DEC 14 1971

3,627,282

INVENTOR.
W. G. KINSLOW

BY

Young + Quigg

ATTORNEYS

PATH ARRANGEMENT FOR PARISON HEATING

CROSS-REFERENCE TO RELATED INVENTION

This is a continuation-in-part of copending patent application, Ser. No. 696,329, filed Jan. 8, 1968, now U.S. Pat. No. 3,477,700.

BACKGROUND OF THE INVENTION

This invention relates to a process and apparatus for heating a preformed hollow parison.

While the blow-molding art goes back over 100 years, it has only been in the last 10 years that the blow molding of hollow plastic articles has achieved significant commercial success. With this expanded utilization of blow-molding techniques has come progressively more rigorous requirements from the purchasers of the finished product with regard to the appearance, durability, chemical resistance, low cost, and the like of the product.

It is a well-known fact that many polymers which are particularly suitable for blow molding such as the olefin polymers, undergo the phenomenon known as orientation when stretched in the solid state at a temperature below the crystalline melt point. Since this orientation can result in as much as a 20-fold increase in tensile strength, it was only natural that attempts should be made to utilize this phenomenon in the production of blow molded hollow articles such as bottles. Since the greatest orientation occurs at a temperature just below the crystalline melt point while the polymer is on a heating cycle, it was early recognized that little orientation could be effected in a conventional blow-molding operation wherein a molten parison was extruded between mold halves and blown; first the temperature of the parison could not be controlled close enough, and second the slight orientation achieved was predominantly in the circumferential direction since at best only a minor amount of stretching in the longitudinal direction occurred. One method of achieving the desired product is to extrude or mold a hollow parison preform, cool it to room temperature, carefully reheat it to just below its crystalline melt point, and then transfer it to a molding station where it is grasped at both ends, stretched longitudinally, thus imparting orientation in a longitudinal direction, and thereafter placed quickly in a mold and expanded to conform to the shape of the mold by the introduction of fluid pressure into the interior of the parison, thus stretching it circumferentially to impart orientation in a second direction. Such a procedure achieves a product of exceptional strength, and surprisingly, in the case of materials such as polypropylene, greatly improved optical properties.

However, since the optimum temperature for orientation is that just below the crystalline melt point of the material comprising the thermoplastic parison, it is apparent that special care must be taken in heating and in transferring the parison to the molding station so as to achieve uniform heating of the parison and so as to transfer parison which is at a temperature just below its crystalline melt point, without in any way damaging it. A simple and economical method of heating hollow parisons would be simply to pass the parisons through a circulating air oven. However, since the parisons are going to be heated to a temperature just below their crystalline melt point there is a problem of distortion of the parisons during this heating step if they are not handled carefully. By placing the parisons around vertically disposed supporting pins they can be moved through the heating oven and uniformly heated without distortion due to sagging. In many instances, however, for instance where the blowing station is horizontally disposed, or in instances where the blowing station is vertically disposed but the parison is moved into position in the blowing station by grasping it while in the horizontal position and rotating it 90°, it is necessary that the parison be received from the heating zone in a horizontal position.

Also, because of the relatively narrow temperature range at which maximum orientation can be achieved, even the slight temperature variation near the walls of an oven can cause a sufficient variation in the temperature of the parisons as they pass out of the oven as to give erratic results in the finished item. Even if the heating fluid in an air oven has uniform flow, exposure of one side of the parison to an oven wall of a different temperature during the last pass before it exits from the oven results in uneven heating.

SUMMARY OF THE INVENTION

It is an object of this invention to provide for heating a preformed hollow parison while in a vertically disposed position and thereafter to transfer said parison to a horizontal position preparatory to being received by a molding station. It is a further object of this invention to provide for heating a preformed hollow parison in an air oven to a temperature just below its crystalline melting point and thereafter transferring said parison into position for being received by a molding station, without damaging said parison, and it is yet a further object to provide more uniform heating of a parison in an oven.

In accordance with this invention an endless chain is positioned within a heating oven, said chain having support means affixed thereto. Preformed hollow parisons are loaded onto these pins and conveyed in a winding path through the oven and out at a point spaced apart from the sidewalls of said oven to heat said parisons to a temperature below the melt point of the thermoplastic material comprising the parison.

DESCRIPTION OF THE PREFERRED EMBODIMENTS

Figure 2:
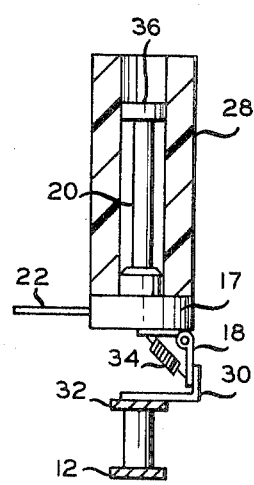
FIG. 2 is a view partially in section of a support base carrying a parison.

The novel heating oven and parison transfer mechanism of the instant invention can be used in the heating of hollow thermoplastic parison preforms made, for instance, of any orientable thermoplastic materials such as polymers of at least one 1-olefin, said 1-olefin having two to eight carbon atoms per molecule, poly(vinyl chloride) and the like. It is especially useful in the heating of parisons made of polymers of 1-olefins selected from the group consisting of ethylene, propylene, butene and mixtures thereof, more particularly polypropylene.

These polymers can be formed into hollow parison preforms and cooled to a temperature below their crystalline freezing point. These hollow parison preforms in the solid state are then heated to a temperature of about 1° to about 50°, preferably 5° to 25° F. below their melting point (crystalline melting point in the case of crystalline polymers) in an oven while disposed in a vertical position and thereafter transferred to a horizontal position preparatory to delivery to a molding station. At this molding station these parisons are generally stretched longitudinally to impart longitudinal orientation; they are then caused to expand to conform to the shape of a mold by the application of a pressure differential between the interior of the parison and the mold wall thus imparting circumferential orientation to give a biaxially oriented product. This orientation process imparts as much as a 20-fold increase in tensile strength to the plastic material.

The crystalline melt point can be determined by heating a small piece of the plastic under a polarizing microscope. The specimen is heated slowly and the temperature at which birefringence disappears is the crystalline melt point.

While the polymer at the temperature for achieving maximum orientation still contains a certain amount of crystallinity and thus has the general physical appearance of solid polymer as opposed to being in a fluid, easily moldable, condition, it is apparent that, at a temperature of 1° to 50° F. below the crystalline melt point, a considerable amount of the crystallinity has disappeared and the parison cannot be subjected to rough handling.

The preformed hollow parison can be formed initially with one closed end and one open end and the open end placed over the supporting pins in the heating oven, or the parison preforms at this stage can simply be sections of pipe or tubing which are open at both ends and which are clamped or pinched off at one end after delivery to the molding station.

By the term "molding station" as used throughout the specification and claims is meant either a single station where the heated parison is introduced into a mold and expanded by means of differential fluid pressure or a two or three stage molding station wherein the parison is first stretched longitudinally to impart longitudinal orientation and then introduced into a mold and caused to conform to the shape of the mold by introduction of fluid pressure into the interior of the parison.

The oven will generally be of the circulating air type with blowers to circulate the air vigorously. Thermostats capable of controlling the temperature within ±3° F., preferably within ±1° F., are used since hot spots and wide temperature fluctuation cannot be tolerated when it is desired, as here, to heat the polymer to just below its crystalline melt temperature. Other heating means such as radiant heaters can also be employed. Thus, the invention is also applicable to heating with an infrared means where the sidewalls also cause a temperature variation.

Figure 1:
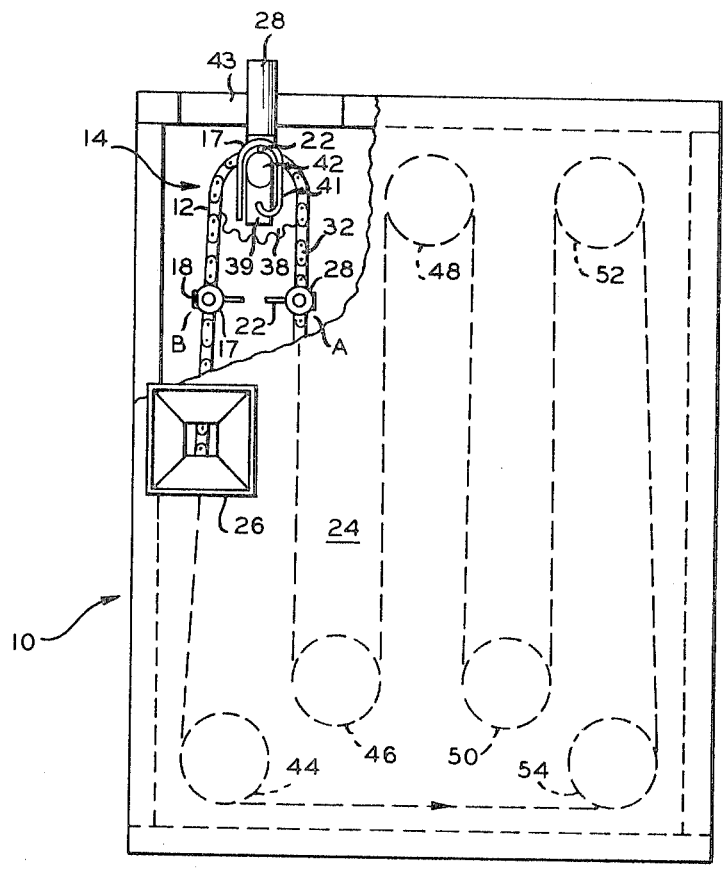
FIG. 1 is a plan view with portions broken away showing the preferred embodiment of the heating oven and parison transfer mechanism.

Referring now to FIG. 1 there is shown a heated air oven 10 with the top portion partially cut away so as to show the endless chain 12 and the parison transfer station 14. Spaced along this endless chain are support bases 17 made of heat resistant plastic. Each support base is attached to a link plate of said chain by means of hinge 18. Upstanding from said support base is vertically disposed support pin 20. Projecting inwardly from said support base is cam follower 22. Affixed atop top wall 24 of oven 10 is parison loading mechanism 26 which is simply a funnel in this embodiment. Thus, the parisons are near a sidewall of the oven on entry thereto which is satisfactory since temperature variations in the parison at this point are of no consequence. As endless chain 12 is incrementally advanced forward as shown by the arrow, a support base 17 is positioned under parison insertion mechanism 26, and a parison is dropped into place over vertically disposed support pin 20. At the same time an identical support base carrying parison 28 is moved from under said parison insertion mechanism, and another identical support base 17 is rotated about hinge 18 so as to transfer parison 28 to a horizontal position for delivery from the heating zone to a molding station. As can be seen from FIG. 1, parison 28 emerges from the oven at a point spaced apart from the sidewalls. Thus, during the critical final heating time, the parison travels through an area nearer the center of the oven spaced apart from the sidewalls where the temperature is not affected by conduction through the sidewalls and thus is more uniform.

Referring now to FIGS. 1 and 2, support base 17 is hinged to flange 30 which is attached to chain link plate 32. FIG. 2 shows a support base 17 carrying a parison 28 in a vertical position and thus reflects the position of these elements as they approach the parison transfer station 14, this position being designated by the character A in FIG. 1. Base 17 is biased in a horizontal plane, so as to position support pin 20 in a vertical position, by spring 34. It is apparent that a spring clip or other means of biasing the support pin in a vertical position can be employed; thus the term "spring" as used herein is intended to include coil springs, flat metal spring clips and the like.

It is highly preferred that the portion of internal support pin 20 which touches the parison be made of low coefficient of friction, low thermal conductivity material such as polytetrafluorethylene. Preferably the static coefficient of friction against solid polyethylene, for instance, is less than about 0.5, more preferably less than about 0.25, most preferably less than about 0.1. Preferably the thermal conductivity $k$ value of the material comprising this washer is less than 3.9, more preferably less than 1. By $k$ value is meant the standard $k$ value in BTU/(hr.)(ft.)$^2$(°F./inch). By using such a material the parison slides easily onto and off of the supporting pin and does not stick to washer 36. The support base is preferably made of a similar material to that of the washer so that the parison cover is in contact with no metal while in the heating zone. Contact of the parison preform while in the heating zone with any metal part which stays within the heating zone is undesirable since the metal, being a high thermal conductivity material, would transfer an excessive amount of heat into the parison at the points of contact, thus causing distortion and sticking. As shown in FIG. 2, a washer 36 of Teflon TFE (Registered Trademark) is affixed to the upper portion of vertically disposed support pin 20 and serves to form the point of contact between the parison and the support pin.

As the endless chain approaches sprocket 38, cam follower 22 on base 17 engages cam sloping surface 39 on the cam plate which is stationary and is carried by the oven by means not shown. As the chain continues its travel around sprocket 38, base 17 is rotated to a vertical plane thus rotating support pin 20 carrying parison 28 to a horizontal position as the cam follower reaches the highest point on cam surface 39. The chain carried by sprockets 44, 46, 48, 50, 52, and 54 in addition to sprocket 38 advances forward in discrete increments, controlled by a conventional indexing mechanism such as a Geneva type, such that it stops with a support base 17 at the transfer station in the position shown in FIG. 1. The parison is then removed from support pin 20 through aperture 43 in oven 10 and delivered to a molding station (not shown). As the chain moves forward again, cam follower 22 passes the high point on cam plate 42 and support pin 20 is returned to a vertical position through the action of rail 41. As can be seen from FIG. 1, cam follower 22 is raised to a position between the cam plate and rail 41 by the action of sloping cam surface 39. It is then returned to a horizontal position by the action of rail 41. Since FIG. 1 is a plan view, the parison support carrying a heated parison which is shown approaching the parison transfer station 14 (position A) from the interior portion of the oven and the identical support shown leaving this station (position B) along the sidewall of the oven look somewhat similar. However, it can be seen by the position of the shade lines that in the first instance the interior of a cylinder (parison 28) is being viewed and in the second, washer 36 and the base 17 itself are being viewed. This support base, now in the position designated by the character B is ready to receive another parison when it moves under parison loading mechanism 26.

Parison loading mechanism 26 can comprise a clamping mechanism for holding one end of a parison, said clamping mechanism being attached to an air cylinder which pushes the parison downward over the supporting pin at the appropriate time, or it can simply be a hollow cylinder into which the parisons are fed and directed to fall by the force of gravity over one of the vertically disposed supporting pins or a funnel as shown.

To conserve heat, a sliding door or the like can cover the opening to the parison loading station and the aperture 43 during the portion of the cycle where no parison is being loaded or unloaded.

Figure 3:
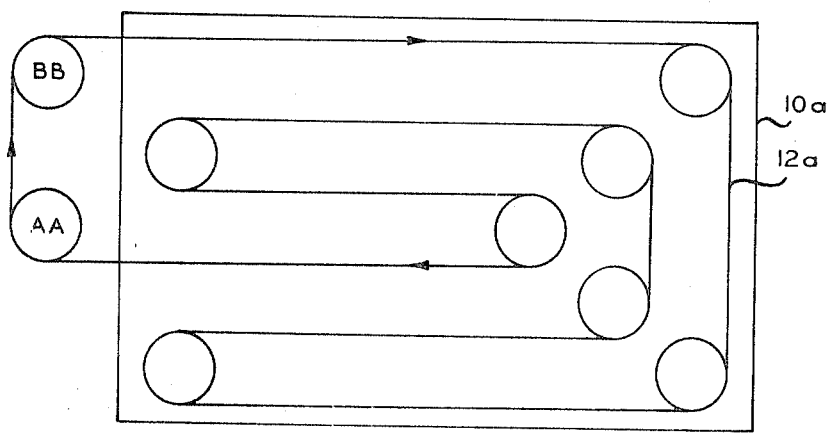
FIG. 3 is a plan schematic view of an alternative chain arrangement.

Referring now to FIG. 3, there is shown an alternative arrangement of the chain wherein parisons are introduced into oven 10a at loading means or station BB, pass through as shown by the arrows, and exit from essentially the center at unloading means or station AA.

Many standard parts such as temperature controllers, bolts, clamps, and the like, have not been shown for the sake of simplicity but their inclusion is understood by those skilled in the art as is within the scope of the invention.

EXAMPLE

Propylene homopolymer having a density of 0.905 (ASTM D 1505–63T), a melt index of 2 (ASTM D 1238–62T, Condition L) and a crystalline melting point of 340° F. was extruded into tubing having an internal diameter of 0.8 inch and a wall thickness of 0.15 inch. This tubing was cooled to room temperature and cut into 5 inch lengths. These 5 inch lengths of tubing were positioned over vertically disposed supporting pins having a Teflon washer at the upper end thereof, said pins being carried by an endless chain, and conveyed through an air oven such as is shown in FIG. 1 in which they were heated to a temperature of 320° to 338° F. The chain contained about 240 support pins and advanced at 6 second intervals to give a total heating time of 24 minutes for each parison. These heated parisons, while at a temperature of 2° to 20° below their crystalline melting point were transferred from a vertical to a horizontal position by a parison transfer mechanism, such as is shown in FIGS. 1 and 2, and received by a blow-molding station where they were stretched longitudinally, placed in a mold cavity, and expanded by introduction of internal fluid pressure so as to cause them to conform to the shape of the mold. The resulting biaxially oriented bottles were uniform in appearance indicating that the parison had not been damaged or distorted during the heating or transfer operations.

While this invention has been described in detail for the purpose of illustration it is not to be construed as limited thereby but is intended to cover all changes and modifications within the spirit and scope thereof.

I claim:

1. Apparatus comprising in combination:
an oven;
an endless chain having support means for carrying thermoplastic parisons on a winding path through said oven;
a parison loading means; and
a parison unloading means, said chain being so disposed that it passes adjacent a first sidewall toward a backwall on a first path, over a first sprocket and along a backwall toward a second sidewall on a second path, around a second sprocket and along said second sidewall toward a front wall on a third path, around a third sprocket and back toward said backwall along a fourth path spaced inward from said third path, around a fourth sprocket and toward said first sidewall along a fifth path spaced inward from said second path, around a fifth sprocket and back toward said front wall along a sixth path spaced inward from said first path, around a sixth sprocket and back toward said backwall along a seventh path spaced inward from said sixth path, and around a seventh sprocket toward said front wall along an eighth path separated from said first sidewall by paths 1, 6 and 7 and separated from said second sidewall by paths 3 and 4.

2. Apparatus according to claim 1 wherein said chain on said final pass emerges from essentially the center between said sidewalls.

3. Apparatus according to claim 1 wherein said oven is an air oven.

4. Apparatus according to claim 1 wherein said parison loading means is disposed so as to introduce said parisons onto said chain as said chain passes adjacent said first sidewall of said oven.

5. Apparatus according to claim 4 wherein said support means comprises vertical pins.

6. A method of heating a thermoplastic parison to molecular orientation temperature comprising introducing said parison into a heating zone and passing said parison adjacent a first wall of said heating zone toward a backwall of said heating zone on a first path, along said backwall toward a second sidewall on a second path, along said second sidewall toward a front wall along a third path, back toward said backwall along a fourth path spaced inward from said third path, toward said first sidewall along a fifth path spaced inward from said second path, back toward said front wall along a sixth path spaced inward from said first path, back toward said backwall along a seventh path spaced inward from said sixth path, and back toward said front wall along an eighth path separated from said first sidewall by said first, sixth and seventh paths and separated apart from said second sidewall by said third and fourth paths.

7. A method according to claim 6 wherein said path along which said parison is passed out of said heating zone is essentially in the center of said heating zone.

8. A method according to claim 6 wherein said thermoplastic material is a polymer of at least one 1-olefin said 1-olefin having two to eight carbon atoms per molecule and said orientation temperature is 1°–50° F. below the crystalline melting point thereof.

9. A method according to claim 6 wherein said thermoplastic is polypropylene and said orientation temperature is 5°–25 F. below the crystalline melting point thereof.

10. A method according to claim 6 wherein said parison is introduced into said heating zone along said first sidewall thereof.

* * * * *